United States Patent  [11] 3,596,777

| [72] | Inventor | Allan B. Neely, Jr.<br>P. O. Box X, Limon, Colo. 80828 |
|---|---|---|
| [21] | Appl. No. | 872,660 |
| [22] | Filed | Oct. 30, 1969 |
| [45] | Patented | Aug. 3, 1971<br>Continuation-in-part of application Ser. No. 719,411, Apr. 8, 1968, now Patent No. 3,523,616. |

[54] BALING CHAMBER FOR BALE-STACKING APPARATUS
12 Claims, 32 Drawing Figs.

| [52] | U.S. Cl. | 214/6 |
|---|---|---|
| [51] | Int. Cl. | B65g 57/22 |
| [50] | Field of Search | 214/6 B, 7, 6 P, 6 S, 6 H |

[56]  References Cited
UNITED STATES PATENTS

| 3,330,426 | 7/1967 | Bishop | 214/6 B |
|---|---|---|---|
| 3,367,518 | 2/1968 | Bishop | 214/6 B |
| 3,395,814 | 8/1968 | Grey | 214/6 B |
| 3,446,369 | 5/1969 | May et al. | 214/6 B |
| 3,497,085 | 2/1970 | Jay et al. | 214/6 B |
| 3,501,025 | 3/1970 | Jay et al. | 214/6 B |

*Primary Examiner*—Gerald M. Forlenza
*Assistant Examiner*—Robert J. Spar
*Attorney*—Van Valkenburgh & Lowe ABSTRACT: The apparatus disclosed herein is a bale-collecting and stack-forming apparatus adapted to be carried upon a truck or a similar vehicle. A conveyor at the side of the truck picks up bales and elevates the same to a dispensing chamber at the side of and above the bed of the truck. An assembly platform alongside the dispensing chamber overlies the bed of the vehicle and bales are moved from the chamber onto the platform. The movement of bales from the chamber onto the platform is by swing arms and by a paddle which arranges the bales in longitudinal, transverse patterns to form a stack layer on the platform. Once the platform is loaded with a bale stack layer, it is actuated to move the bale stack layer onto a bale stack carrier on the vehicle. Subsequently, the bale stack, when it is completed, is removed from the carrier.

INVENTOR.
Allan B. Neely Jr.
BY Van Valkenburgh & Lour
ATTORNEYS

INVENTOR.
Allan B. Neely Jr.
By Van Valkenburgh & Lowe
ATTORNEYS

INVENTOR.
Allan B. Neely Jr.
BY
Van Valkenburgh & Lowe
ATTORNEYS

INVENTOR.
Allan B. Neely Jr.
BY
Van Valkenburgh & Lowe
ATTORNEYS

BALING CHAMBER FOR BALE-STACKING APPARATUS

The present application is a continuation-in-part of application of my prior application, Ser. No. 719,411 filed Apr. 8, 1968, now U.S. Pat. No. 3,523,616 for a Bale Stacking Apparatus, the present application claiming matter disclosed, but not claimed in the prior application and also disclosing additional subject matter pertinent to the invention.

This invention relates to hay bale collecting and stacking apparatus, and more particularly to mobile bale-stacking machines which are adapted to move across a field to pick up, arrange and stack hay bales and thereafter, convey completed stacks to any desired location. As such, the invention will be hereinafter referred to as a "bale-stacking machine."

Conventional hay-baling machines are adapted to manufacture bales having various heights, widths and lengths, but all are of modular proportions and ordinarily, the length of a bale may be two or three times its width. This modular arrangement is desirable to permit the erection of hay bale stacks wherein the bales are arranged in interlocking patterns so that they will not fall out of the stack and the stack will not collapse. Such interlocking patterns can be formed in various ways as the workmen build up the bale stacks. With forklift trucks now available at practically every farm, the bales are often stacked upon a pallet so they may be lifted and conveyed by the forklift truck. When using a forklift truck, it is obvious that the stack on a pallet must be arranged in an interlocking pattern because of the rough usage to which the bale stack may be subjected when being carried by the truck.

The present invention was conceived and developed to provide a better means for erecting hay bale stacks, especially upon pallets. The improved machine, preferably mounted upon a truck, or bale-stacking vehicle, will move across a field to pick up hay bales and arrange them as stacks upon pallets. Further, the individual bales in the stack are arranged in a desirable alternating, interlocking pattern. Certain important features of the machine consist of a baling chamber whereinto the bales first move and wherefrom they are dispensed to swing and/or shift onto an assembly platform to form a layer of bales which thereafter becomes a portion of a stack.

It follows that an object of the invention is to provide a novel and improved bale-stacking machine which is adapted to pick up hay bales as they lie in a field and to thereafter arrange these bales in stacks having interlocking layers.

Another object of the invention is to provide a bale-stacking machine which is adapted to form bale stacks upon a pallet to permit the use of a forklift truck in handling the stacks.

A further object of the invention is to provide a novel and improved bale collecting and stacking machine which is of a simple, versatile design capable of being mounted upon conventional vehicles such as trucks and field tractors.

A further object of the invention is to provide a novel and improved apparatus for receiving hay bales and for placing the bales upon a platform to form a layer of bales arranged in a pattern which will vary from one layer to the next so that the layer may be subsequently placed upon other layers to form a bale stack with the varying patterns effecting an interlocking of the bales in the stack.

Further objects of the invention are to provide a novel and improved automatic bale-stacking machine which is simple, economical, of substantial capacity and is an easily operated and easily maintained apparatus, either with manual or automatic controls being used, as desired.

With the foregoing and other objects in view, all of which more fully hereinafter appear, my invention comprises certain constructions, combinations and arrangements of parts and elements as hereinafter described, defined in the appended claims and illustrated in preferred embodiment in the accompanying drawing in which:

Referring first to FIGS. 1 to 19 of the drawing, the improved bale collecting and stacking apparatus is shown as being built upon a conventional flatbed-type motor truck T. An ordinary truck having a rating of at least two tons can be provided with a bed long enough and wide enough to hold several completed stacks of bales sized to be carried upon forklift pallets. The truck T, as illustrated in the drawing, represents a standard type of truck having a bed large enough to hold six such stacks of bales when fully loaded, in a pattern of two stacks wide and three stacks deep. A truck, having the improved bale-stacking machine mounted upon it, may be driven around a hay field to pick up bales and form stacks until it is fully loaded. Then, it may be driven to a selected location where the bales are unloaded. The truck then returns to the field for reloading.

It is contemplated that the truck will be unloaded in any of several ways. The bale stacks may be taken off the truck bed with an ordinary forklift truck. However, the unloading may be accomplished by moving the stacks off the struck and onto a loading dock or onto a ramp, or by any other suitable operation which need not be described in further detail.

FIGS. 1 to 19 disclose the apparatus as being mounted upon a motor truck T, FIG. 20, discloses the apparatus on a tractor and FIGS. 31 and 32 disclose the apparatus on a conventional bale stacker as hereinafter described, but it is quite apparent that the bale-stacking machine could be easily modified to be built upon other vehicles such as a flatbed trailer which could be towed by a tractor.

The basic components of the machine may be described in connection with the movement of a bale through them. A bale collecting and lifting conveyor L is mounted at the forward end of a carriage H which is attached to the left side of the truck. This conveyor lifts bales to the maximum height of a stack to be formed upon the truck and a bale-dispensing chamber C is mounted upon the top of this carriage behind the discharge end of the conveyor. The carriage is mounted on the truck so that the chamber C is located immediately behind the cab of the truck at a position where bales may be discharged laterally from it and onto a stack-layer assembly platform A mounted above, and over the front portion of the bed of the truck T.

This assembly platform A is carried upon a framework F secured to the truck. It is the full width of the truck bed and is capable of being loaded with a layer of bales sufficient to form a pair of adjacent stacks. A bale layer drag D is mounted over the assembly platform and is adapted to drag a layer of bales for one stack transversely across the assembly platform A after they are deposited thereon by the bale-dispensing chamber C. When two bale layers are formed, the platform A is then adapted to shift forwardly from its loading position over the bed of the truck, and to a retracted position over the cab. This movement drops the bales either upon platens P carried on the arms of a stack-lowering support S, or upon other layers of bales previously dropped thereon. The support S is also carried upon the frame F, and is adapted to move vertically from an initial position underneath the assembly platform A and downwardly as layers of bales are deposited upon it. When it reaches and rests upon the truck bed, the stacks are completed.

The completed pair stacks at the forward end of the truck bed will be moved rearwardly by a transverse drag bar M on the surface of the truck bed which engages portions of the platens P underneath the arms of the support S. The rearward movement of the stacks clears the supports, getting the stacks out of the way to permit the support S to be raised to form another pair of bale stacks. Each completed pair of stacks is held by posts 30 and a rail 31 at each side of the truck bed and by stack-restraining plates R mounted between selected side posts 30.

All of these components are arranged for sequential operation to move the bales after they are picked up from the field by the lift L and until they are finally placed in completed stacks on the truck. The lift conveys a bale upwardly to the dispensing chamber C. This chamber, mounted alongside the platform A shifts and/or rotates the bale onto the platform to a selected position, coordinated with the positions of other bales thereon, to interlock with other layers of each stack in a manner hereinafter described after the bale layers are dropped onto the stack support S.

The mechanisms to operate these components may be various types of conventional actuators and motors, and preferably, hydraulic cylinders and hydraulic motors which may be operated by a common supply pumping system. The hydraulic cylinders have extension and retraction lines which connect with four-way valves in a conventional manner, while the valves, in turn, will connect with supply and discharge lines. The valves may be located at a position where they may be manually operated or preferably, they may be a solenoid, electrically operated type. The switches of electrical circuits which operate these valves may be conveniently placed within the cab of the truck if they are to be operated manually. The electrical system may also include circuits which warn or indicate to the operator that a certain movement is completed and that he may close the switch of the next circuit in the operating sequence. As a further refinement, the switches may be programmed by mounting them upon any conventional type of stepper or sequence switching system. Accordingly, in the following description wherein the mechanical features of the apparatus are not described in detail, it is to be understood that any suitable manual or automatic, or partially manual, partially automatic control system may be used with the apparatus.

The carriage H is a tall, narrow, boxlike framework formed of vertical, longitudinal and transverse structural members 35 which are welded together. This carriage is mounted upon the side of the truck with its forward portion alongside the cab and with its rearward portion alongside the forward portion of the truck bed. Whenever the truck is loaded with bales and is ready to transport them from the field, it is desirable to disconnect the carriage H especially since the truck would otherwise exceed its legal permissible width if driven upon the highway. Accordingly, the carriage is suspended by a disconnect means, such as from hooks 36 mounted upon the side of the truck bed and upon the frame F over the cab and forwardly therefrom, as in the manner illustrated at FIG. 3. Sockets 37 are provided on the members 35 forming the carriage frame as in the manner illustrated at FIG. 4. With this arrangement, it is necessary to merely lift the carriage from the hooks 36 on the truck and when removed, the carriage may be held in a suitable cradle, not shown, or it may be mounted upon support legs 38 which are shown in their retracted position at FIG. 2.

Since the carriage will weigh several hundred pound, it must be supported when carried upon the side of the truck to prevent the truck from leaning sidewise. A triangular outrigger arm 39 is pivotally connected to the carriage frame to carry a stabilizing wheel 40 at its outstanding apex end. The arm and wheel are raised and lowered by a cylinder 41 connected to the apex of the arm 39 and to a carriage frame member thereabove as by suitable clevis pin connectors 42. The wheel 40 is preferably of a large diameter so that it will not be caught in chuckholes in the field and it is carried upon a caster mount 43 so that it will swing to rotate in any direction and not skid whenever the truck is making a sharp turn.

Figure 1:
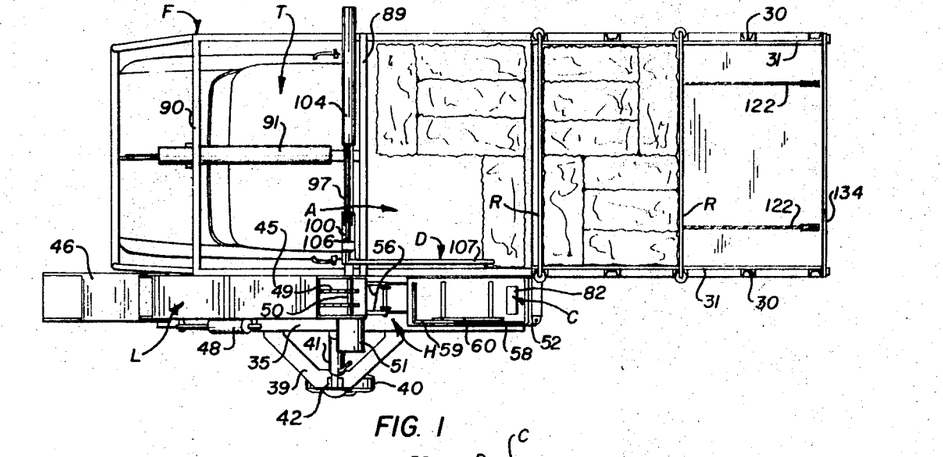
FIG. 1 is a plan view of a truck modified to incorporate thereon my improved bale pickup and stacking machine, and illustrating a pair of completed stacks in the middle section of the truck bed and a pair of partially completed stacks being formed at the front end of the truck bed.
Figure 2:
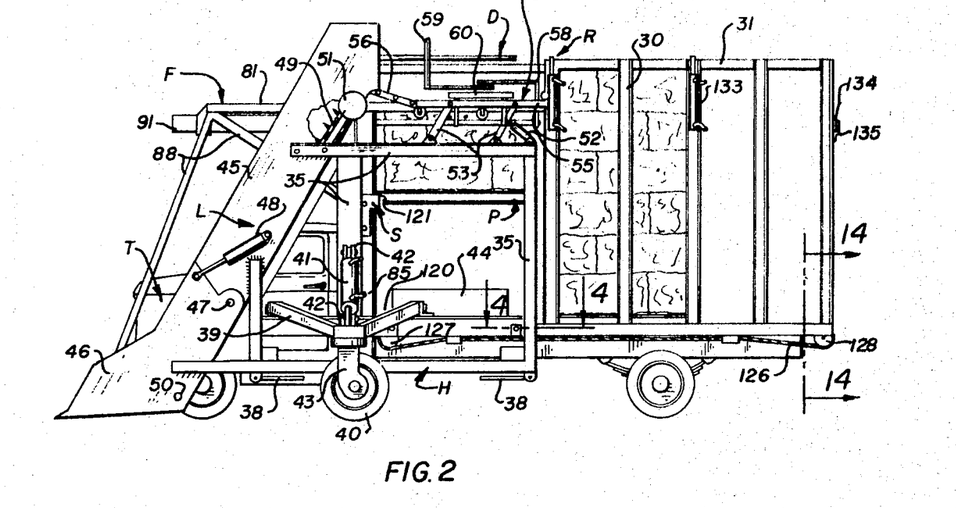
FIG. 2 is a side elevational view of the unit shown at FIG. 1, but with portions broken away to show constructions otherwise hidden from view.

The hydraulic lines from the cylinder 41 and from other cylinders supported upon the carriage, will extend to control valves which may be suitably housed in a control box 44 which is carried upon the frame members 35 as in the manner illustrated at FIG. 2. Certain hydraulic lines and/or electrical lines from this control box will necessarily extend to the truck itself in any suitable manner, not shown, and it is further contemplated that such lines will include conventional disconnects between their extension from the control box 44 and to the truck which are necessary to disengage whenever the carriage is disconnected from the truck.

The bale lift L is conventional and several types are available for purchase. It is mounted upon the forward portion of the carriage H with its discharge end being at the forward edge of the truck bed. This lift is illustrated as an elongated, inclined, enclosed chute 45 secured to the structural members 35 as by welding. The lower, forward section 46 of the chute is suspended from the main section thereof by a pivot 47 so that it may be raised and lowered as by a cylinder 48 having its base and piston end connected to the chute components by pivot lugs as illustrated. An operator controlling the forward chute section 46 through the cylinder 48, can thus raise and lower it as a bale moves into the chute or when necessary, raise this section out of the way of rocks or hummocks whenever the truck is being driven over rough ground.

The conventional mechanism within the bale lift L includes an endless chain 49 of a type which is provided with gripping spikes to hold the bales. This chain is mounted upon sprocketed shafts 50 at each end of the lift. It is driven by a hydraulic motor 51 mounted upon the chute section and connected with the upper shaft 50. In field loading, such a motor may run continuously, but it is preferable that it be controlled by an operator so that it may be slowed down or stopped whenever bales are moving onto the lift at too fast a rate.

Figure 8:
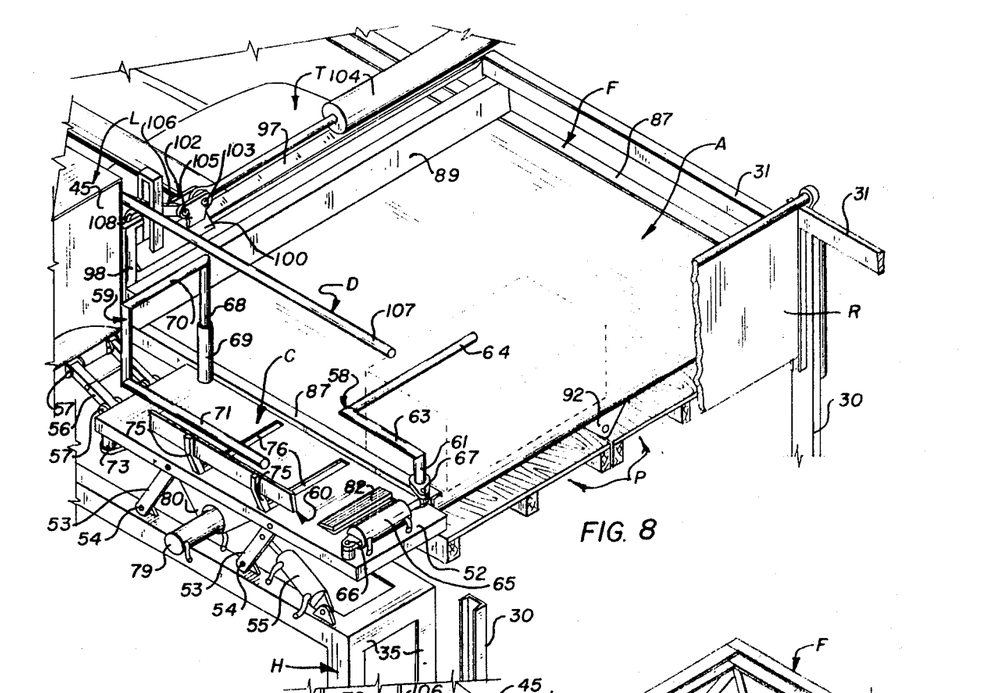
FIG. 8 is a rear, left side isometric view of the bale-dispensing chamber and the bale assembly platform in operative association, and with one chamber arm being swung over the platform to place a bale, indicated in dotted lines, upon the platform.

The bale-dispensing chamber C is formed as a flat, rectangular, longitudinally disposed bed 52 carried above the carriage framework at a height slightly above the level of the top bale layer of the stacks formed by the apparatus. This chamber is directly behind the discharge end of the lift L and alongside the forward end of the truck bed. This chamber is adapted to swing towards and away from the discharge end of the chute of the lift L when it is depositing bales on the assembly platform A alongside it, and to effect such movement, the chamber is mounted upon swing legs 53 which are secured to the underside of the bed and to the top of the carriage members as by pivots 54. This movement is effected by a cylinder 55 mounted upon a frame member 35 and connected to one of the legs as by suitable pin connectors, as best illustrated at FIG. 8. This shifting movement places the forward end of the bed adjacent to the discharge end of the chute 45 at its forward position of the bed, but moves the end of the bed away from this chute end at its rearward position. It is necessary to have a continuous supporting section between the chute exit and the bed when the bed is shifted rearwardly. Accordingly, the gap is bridged by a set of folding arms 56 having their opposite ends connected to the lifting conveyor L and to the edge of the bed by pivots 57 which permit the arms to collapse whenever the chamber moves forwardly and against the conveyor as in the manner illustrated at FIG. 16.

The bed 52 of the baling chamber lies at an elevation slightly above the assembly platform A so that a bale may be easily pushed therefrom and onto the platform A with only a small dropoff action. The movement of a bale from the chamber and onto the platform A is by swing arms or by a paddle as will be described, and such movement is either by rotation of the bale from its longitudinal position in the chamber to a transverse position on the platform, FIGS. 8 and 9, or by lateral displacement from the chamber to the platform, FIG. 22. Such movements of bales are combined to form the bale layer of a stack having an interlocking pattern, and the bale layer of a single stack, as illustrated in the drawing at FIG. 22, consists of one transversely disposed bale at one end of the layer and three longitudinally disposed bales abutted against the side of the transversely disposed bale. By alternating the transversely disposed bales to the forward and to the rear in the successive layers of a stack, the bales in the stack are interlocked, as will be hereinafter further described.

Figure 9:
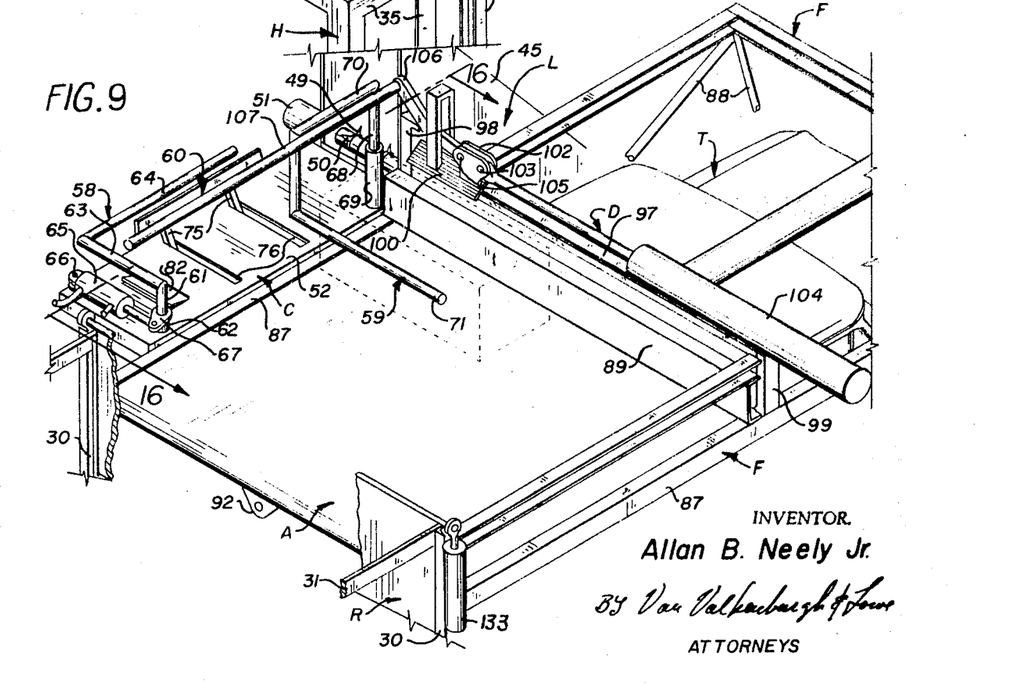
FIG. 9 is a rear, right side isometric view of the bale-dispensing chamber and the assembly platform in operative association, similar to FIG. 8, but with the chamber being shifted and the other arm being swung over the platform to place a bale, indicated in dotted lines, upon the platform.

A first swing arm 58 is mounted at the rear end of the bed 52 to swing a bale from its longitudinal position in the chamber C to a transverse position at the rear of the assembly platform. This arm 58 functions when the bed 52 is shifted to its rearward position as illustrated at FIG. 8. A second swing arm 59 is mounted at the forward end of the bed 52 to swing a bale from its longitudinal position in the chamber to a transverse position at the front of the assembly platform. This arm 59 functions when the bed 52 is shifted to its forward position as illustrated at FIG. 9. A longitudinally disposed paddle 60 is mounted along the outer edge of the bed 52 to shift a bale sidewise, from its longitudinal position in the chamber and without rotation, to the platform A. This paddle 60 functions when the bed 52 is at either the forward or rearward position of the bed 52.

The rear swing arm 58 includes a vertical shaft portion 61 carried in a bearing 62 at the inner rearward corner of the bed. The arm lies horizontally and includes an end section 63 which extends transversely over the end of the bed when the arm is retracted and a side section 64 which extends longitudinally over the outer edge of the bed when the arm is retracted. This dogleg form of arm is adapted to partially embrace a bale which has moved into the chamber and to swing it to the transverse position at the rearward end of the platform A, as illustrated at FIG. 8. This arm is actuated by a cylinder 65 having its base pivotally mounted upon a pivot anchor 66 upstanding from the surface of the bed and having its piston pivotally connected with a lever 67 outstanding from the pivot 61 of the arm 58.

The forward swing arm 59 includes a vertical pivot 68 carried in a bearing 69 at the inner forward corner of the bed. The arm lies generally horizontally and includes an arched end section 70 which extends transversely over the front end of the bed when the arm is retracted and a side section 71 which extends longitudinally over the outer edge of the bed when the arm is retracted. The arched end section 70 is sufficiently high as to permit a hay bale to move from the chute 45, underneath the arched end section 70 and thence onto the bed 62. The side section of the arm is dropped below this arched section a distance sufficient to contact the outer side of a bale in the chamber and to swing it to a transverse position on the platform as illustrated at FIG. 9. This arm is actuated by a cylinder 72 mounted underneath the bed 52 upon a pivot anchor 73 and having its piston pivotally connected with a lever 74 outstanding from a projection of the pivot 68 which extends through the bearing 69 and projects from underneath the bed 62.

The paddle 60 is located at the central portion of the bed 62 and is carried upon a pair of arms 75 which extend downwardly through transverse slots 76 in the bed 52 to connect with a common longitudinally, centrally disposed shaft 77 underneath the bed. This shaft is held in position underneath the bed by inclined supports 78 depending from the underside of the bed in a spaced V arrangement. This paddle is actuated by a transversely disposed cylinder 79 supported from a cradle pivot 80 depending from the bed structure at the center thereof, with its piston connecting a crossbar 81 between the arms 75.

The shifting bale chamber includes a trip plate 82 in its face which engages an electrical switch E whenever it is dropped, as by a bale moving thereon. This switch E is then actuated and it may either signal an operator that the bale is in position and/or release an interlock where automatic or semiautomatic electrical signal operations are used to operate the apparatus. A similar electrical switch E is located underneath the bed adjacent to the bearing 62 of the rearward shaft 61 to be contacted by a shaft projection 83 on that shaft when the rear swing arm 68 completes its cycle. Another switch E is located adjacent to the lever 74 of the forward swing arm 59 to be contacted by a projection 84 to signal when that arm completes its cycle. Other switches E are located with respect to the swing legs 53, the paddle arms 75 and other operative components hereinafter described.

Figures 10, 11, 12, 13, 14, 15:
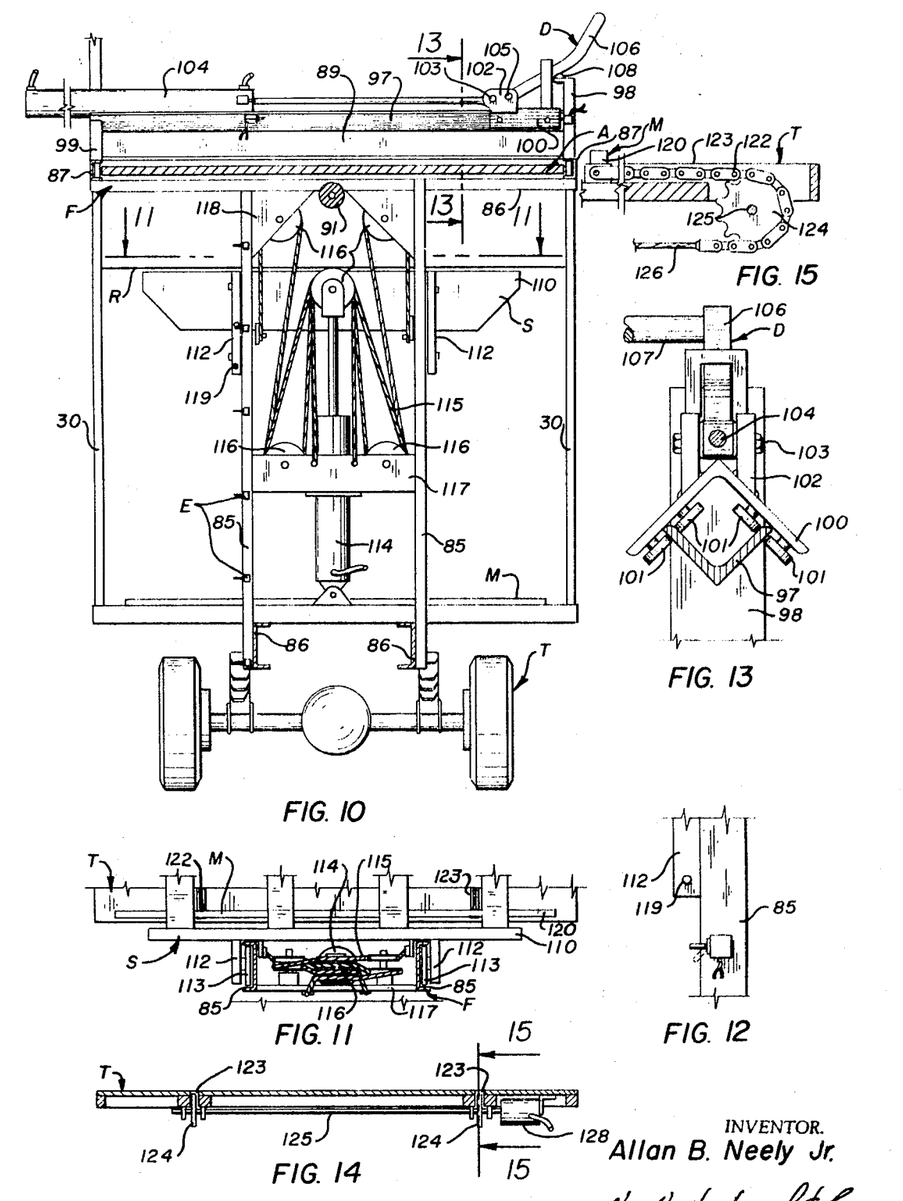
FIG. 10 is a transverse sectional elevational view of the truck-mounted portion of the machine as taken from the indicated line 10-10 at FIG. 3, but on an enlarged scale.
FIG. 11 is a fragmentary sectional plan as taken from the indicated line 11-11 at FIG. 10.
FIG. 12 is a fragmentary detail of a portion of the showing at FIG. 9, but on an enlarged scale and as taken from the indicated arrow 12 at FIG. 11.
FIG. 13 is a fragmentary sectional detail as taken from the indicated line 13-13 at FIG. 10, but on an enlarged scale.
FIG. 14 is a transverse, fragmentary sectional detail as taken from the indicated line 14-14 at FIG. 2, but on an enlarged scale.
FIG. 15 is a fragmentary sectional detail as taken from the indicated line 15-15 at FIG. 14, but on an enlarged scale.
Figures 16, 17, 18:
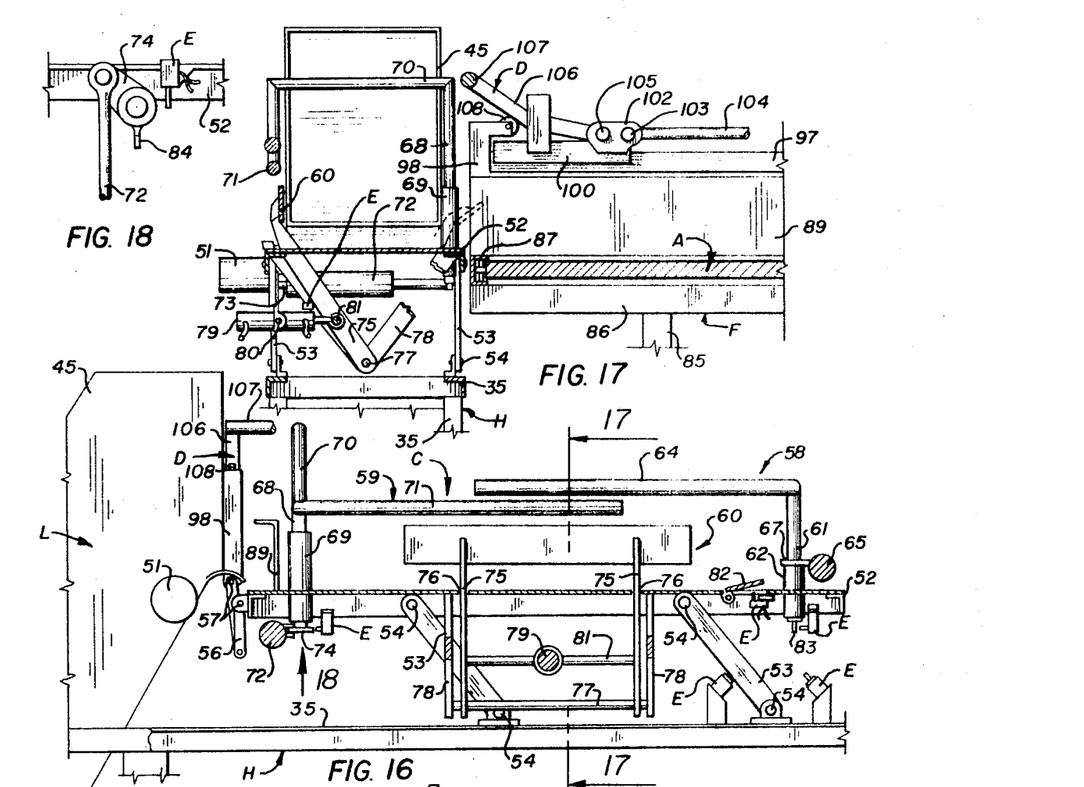
FIG. 16 is a longitudinal, sectional elevational view of the bale-dispensing chamber as taken substantially from the indicated line 16-16 at FIG. 9, but on an enlarged scale, and with both arms being in their retracted positions.
FIG. 17 is a transverse, sectional elevational view as taken from the indicated line 17-17 at FIG. 16.
FIG. 18 is a fragmentary detail as taken from the indicated arrow 18 at FIG. 16, but on an enlarged scale.

The framework on the truck is formed by a pair of upright channels 85 which are secured to the main longitudinal frame members of the truck T immediately behind the cab, as illustrated at FIG. 10. To allow space for the uprights 85, the bed of the truck is shifted a short distance rearwardly from its normal position on the frame members 86 immediately behind the cab. A tee channel 86 extends transversely across the top of these uprights to support a pair of longitudinally disposed guide channels 87 which set upon and extend rearwardly from the tee channel 86 to the rearward position of the bale-dispensing chamber where they connect with a structural post 30 upstanding from the truck bed. The guide channels 87 also extend forwardly from the supporting tee channel and over the cab of the truck with their forward ends being supported by struts 88 which extend downwardly at various angles to connect with the front bumper and with other frame members of the truck T.

The rectangular assembly platform A moves in these guide channels 87 as from a rearwardly extended, loading position directly over the truck bed and alongside the dispensing chamber C, to a forward discharging position directly over the cab of the truck. A transversely disposed diverter 89 upstands from the guideway channels at a position slightly rearwardly from the tee channel, to contact the forward edge of bale layers formed upon the platform A. This diverter prevents the bale layers from moving with the platform A when the platform moves forwardly to drop the bales.

The front ends of the guide channels 87 are interconnected by a crossbar 90 which carries a longitudinally extended cylinder 91 at the center of the frame. The piston of this cylinder extends rearwardly, underneath and past the tee channel 86, to connect with a lug 92 depending from the rearward edge of the platform A. The extension and retraction of this cylinder is effective to move the platform A within its guides 87.

Figures 3, 4, 5, 6, 7:
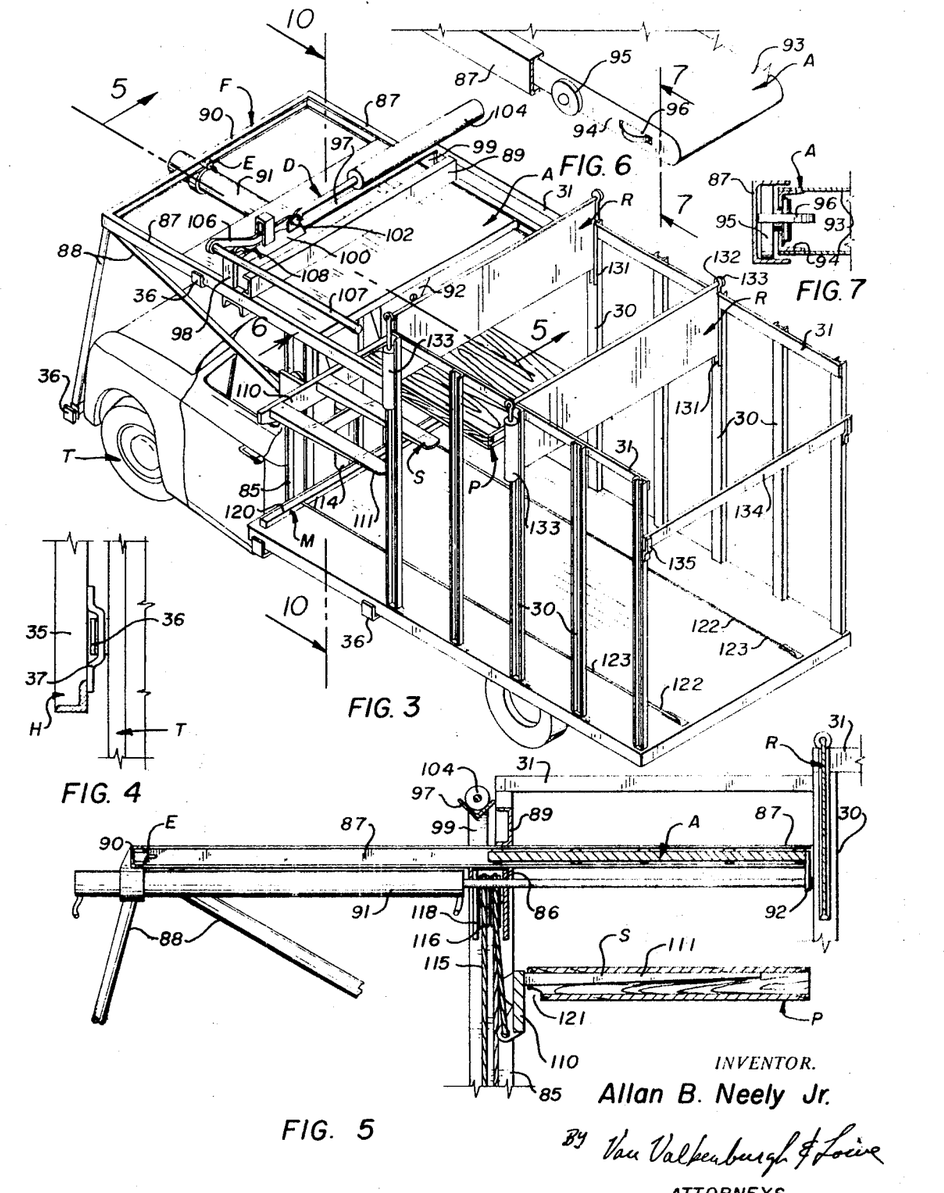
FIG. 3 is a rear left side isometric view of the truck shown at FIG. 1, but without any hay bale stacks in it and with a bale lift and dispensing apparatus normally attached to the truck as being removed to better show the stack-forming mechanisms mounted upon the truck.
FIG. 4 is a fragmentary sectional detail as taken from the indicated line 4-4 at FIG. 2 and on an enlarged scale to illustrate one mode of attaching the bale lift and dispensing apparatus to the truck.
FIG. 5 is a longitudinal sectional view of portions of the stack-forming mechanism upon the truck, as taken from the indicated line 5-5 at FIG. 3, but on an enlarged scale.
FIG. 6 is a fragmentary detail, partly in section, of a portion of the bale assembly platform, and of a guide channel, as taken from the indicated arrow 6 at FIG. 3, but on an enlarged scale.
FIG. 7 is a fragmentary sectional detail as taken from the indicated line 7-7 at FIG. 6, but on a further enlarged scale.

The assembly platform A is formed as a suitable lightweight, smooth, rectangular plate made by fastening top and bottom skin plates 93 to the flanges of channel sections 94 as illustrated at FIGS. 6 and 7. This platform A may be adapted to frictionally slide in the guide channels 87, but preferably, it is mounted upon wheels 95 which ride in the channel between the flanges thereof and also, will include end wheels 96 which prevent the rectangular platform A from cocking or binding in the guideways. A switch E may be placed at the center of the crossbar 90 to contact the assembly plate when it is fully retracted, to thereby indicate the same to the operator in the manner previously explained in connection with other mechanisms.

Figure 22:
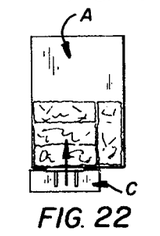
Figure 23:
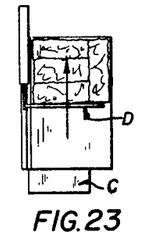
Figure 24:
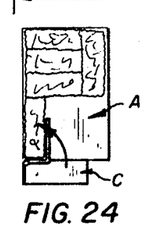
Figure 25:
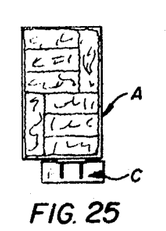
Figure 26:
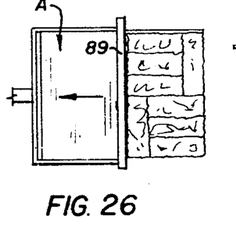
Figure 27:
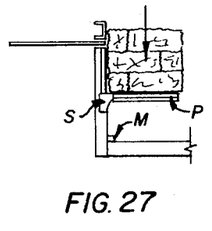
Figure 28:
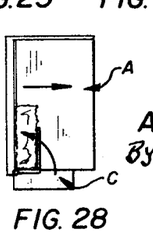

Since a truck width is approximately 8 feet and it is desirable to form two stacks of bales side by side upon the assembly platform A, it is necessary to form a first stack layer on the platform adjacent to the dispensing chamber, as shown at FIG. 22, and to use the bale layer drag to move this layer transversely across the assembly platform to provide room for forming a layer for the second bale stack as shown at FIG. 23.

The bale layer drag D is mounted upon a transverse guideway 97 formed by mounting a structural angle bar with its legs turned upwardly. This bar is mounted upon uprights 98 and 99 which upstand from the longitudinal guide channels 87. A carrier 100, formed as an inverted angle section, is mounted upon this way 97. This carrier includes four sets of opposing guide wheels 101, as illustrated at FIG. 13, which contact the inner and outer surfaces of the angle legs of the guideway to lock the same in position against a lateral pull. A double-pivot clevis 102 upstands from the carrier with a first pin 103 in the clevis connecting with the piston of an actuating cylinder 104 which is mounted over the guideway at the end opposite from the bale-dispensing chamber C.

The other clevis pin 105 connects with a drop arm 106 which carries a longitudinally disposed dragbar 107. This dragbar is normally held above the inner edge of the dispensing chamber C, between the chamber and platform, and out of the way. In the out-of-the-way position, the drop arm 106 contacts and is supported upon a wheel 108 on the upright 98, but this arm drops from the wheel whenever the cylinder 104 is retracted and the first portion of the cylinder retracting action is to lower the dragbar 107 against a layer of bales on the platform to move them across the platform as illustrated at FIG. 23.

The stack support S consists of a forklift-type mechanism carried upon the main channel uprights 85 and is built upon a transverse backboard 110 which lies against the rearward flange surfaces of the uprights. A set of forks 111 extend longitudinally and rearwardly from the backboard to support a pair of pallets P. A pair of connector flanges 112 extend forwardly from the backboard to embrace the outer sides of the channel uprights and each flange includes wheels 113 which ride between the flanges of the channels to hold the backboard in position as it moves up and down along the channel uprights. Vertical movement of the stack support S is effected by a cylinder 114 mounted upon the base of the truck between the channel uprights. Its piston is connected to the backboard by cables 115 at each side thereof which produce a movement magnification through an array of sheaves 116 on the cylinder piston and on a crossbar 117 and on plates 118 between the channel uprights as illustrated at FIGS. 5, 10 and 11.

When the stack support is at its fully raised position, carrying a platen thereon, it will be at an elevation immediately below the lug 92 depending from the assembly platform as at the indicated line X at FIG. 5, and at a position where a drop of the bales from the platform A will not significantly disrupt the arrangement of the bales. When layers of bales are dropped on the the platens P, the stack support S will then move downwardly to a second position where the top of the bale layer is at the specified elevation, indicated by line X at FIG. 5, and to a position to receive another layer dropped by the platform. Subsequent movements of this stack support S will move it to the bed of the truck T in steps which may be indicated and controlled by a pin 119 on a flange 112 which will contact switches E on the adjacent upright 85. At this position, the bale stack is ready to receive its last layer of bales, when the next-to-the-top layer of the stack is at the said elevation line A. The final, top layer is dropped onto the stack by forward retraction of the assembly platform A, as hereinbefore described, however, the platform then remains in its forward position until the stack is moved out of the way.

The stack-moving member M consists of a bar 120 which lies transversely across the bed of the truck at a normal position at the forward end of the bed as illustrated at FIG. 3. When the stack support S drops its platens P upon the bed of the truck, the bar 120 will engage the forward end of these platens as at a notch 121 cut out in the platens for this purpose. The bar 120 is connected to a pair of longitudinally disposed, parallel pull chains 122 which extend rearwardly to the rear of the platform in suitable guideways 123 in the platform, as illustrated at FIG. 15. The rearward ends of the chains are mounted upon sprockets 124 carried upon a common shaft 125. The underside return reach of the chain is converted to a cable 126, for purpose of economy. Each cable extends forwardly and underneath the bed of the truck, as indicated at FIG. 2, to a pulley 127 at the forward end of the underportion of the truck.

The shaft 125 is rotated by a reversible hydraulic motor 128 to move the bar 120 forwardly and rearwardly along the bed of the truck. It is contemplated that the motor will have sufficient power to pull and slide three completed stacks towards the rear end of the truck, as when a loaded truck is depositing its bale stacks onto a deck or ramp at the rear of the truck against which the truck is backed.

Should the truck be driving over a rough field with one or more completed stacks upon it, there is a possibility of bales tipping and falling off the stacks. It was found in field tests that this undesirable action would be avoided if the top layers of the stacks were restrained. Accordingly, the posts 30 on the sides of the truck bed are located at each side of the truck bed at the juncture of the bale positions and each opposing pair carries a restraining plate R, as in the manner illustrated at FIGS. 1 and 3. Each restraining plate is formed as a flat, vertical baffle 130 having each end held in a channellike guide 131 on the face of a post 30. Each end of each baffle 130 has an upper lug 132 overhanging the top of the post and connecting with the piston of a vertically affixed cylinder 133 mounted on the outside of the post. These cylinders, arranged as opposing pairs, are adapted to actuate in unison to raise and lower their baffles. With a truck having a bed adapted to carry six bale stacks, two such baffles will be required at the intermediate positions between the normal bale stack positions, and it is contemplated that these baffles may be raised individually or together and if they are raised together, they may be raised by a single control. The rear end of the truck from whence the bale stacks will be removed, may be closed by a crossbar 134 carried in hooks 135 on the rear posts 30. Any other suitable gatelike structure may be used in this connection, and it is contemplated that this crossbar will ordinarily be connected and disconnected manually.

Figures 19, 20:
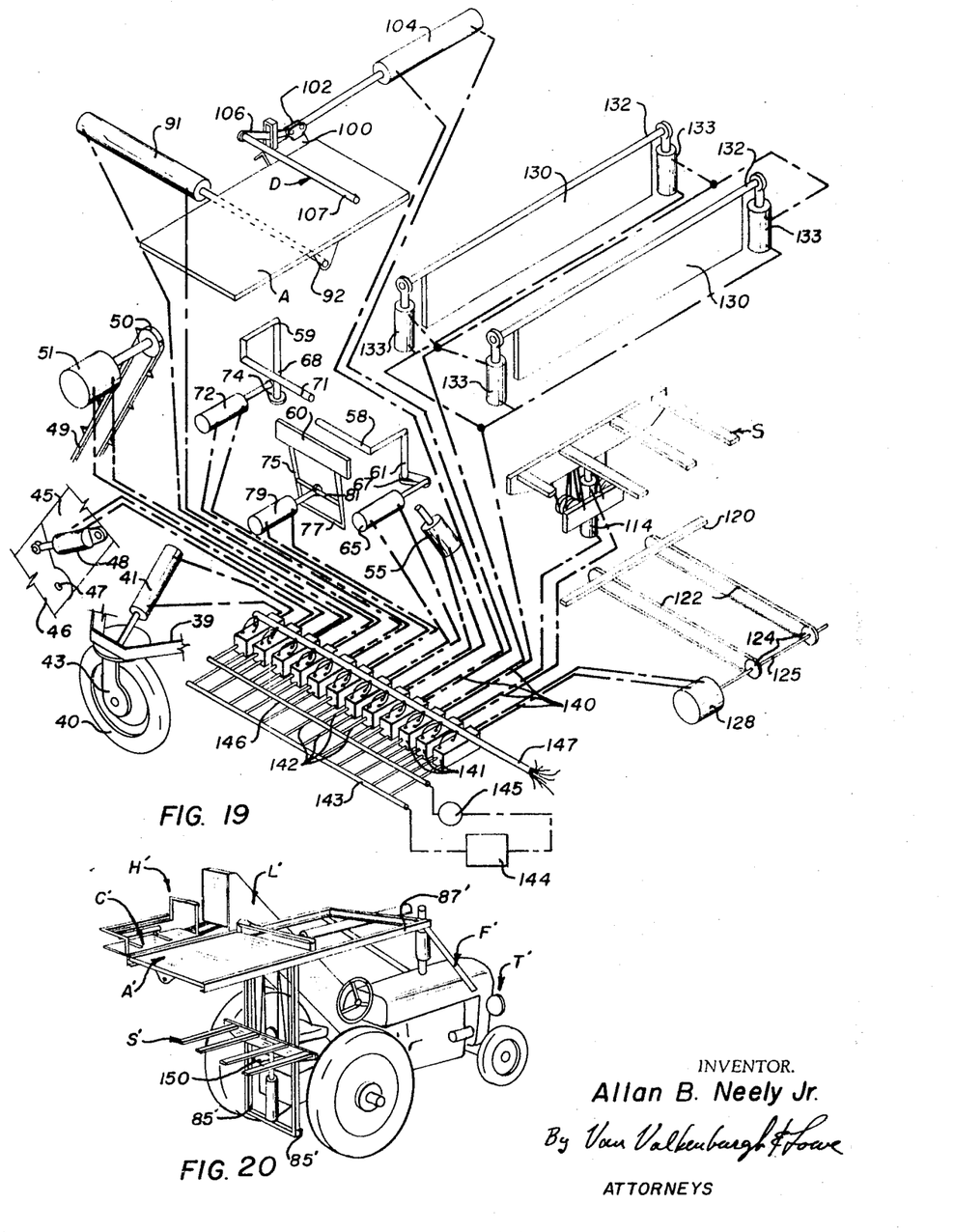
FIG. 19 is a diagram of the hydraulic circuits used in operating the machine.
FIG. 20 is a diagrammatic, rear perspective view, showing a bale-stacking machine mounted upon a field tractor in an arrangement limiting the unit to forming a single stack of bales at a time.
Figure 21:
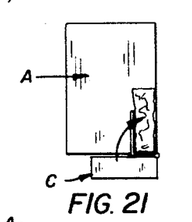
FIGS. 21 through 28 illustrate selected steps, in sequence, in the placing of bales upon the assembly platform and thereafter, forming an interlocking stack of hay bales in accordance with the principles of the invention.

The hydraulic system of the unit described, is set forth in a diagrammatic manner at FIG. 19. Each motor 51 and 128 will operate forward and reverse and each cylinder, 41, 48, 55, 72, 79, 91, 104, 114 and 133 will extend and retract. This requires two hydraulic lines to each, one serving as a pressure line and the other as a retraction line. These pairs of lines are indicated as 140. They are controlled by conventional four-way valves 141 which are illustrated as being arranged in a single bank with pressure and discharge leads 142 therefrom extending to manifolds. The discharge manifold 143 is directed into a reservoir 144. The intake of a power pressure pump 145 is connected to this reservoir and the pressure line extends from the pump to the pressure manifold 146. While a single system is thus shown, it is contemplated that two or more systems may be used. For example, the hydraulic units mounted upon the carriage H may be operated by one system and the hydraulic units carried from the truck may be operated by another system.

Electrical controls are indicated in a diagrammatic manner for connection with four-way valves 141. An electrically operated four-way valve is not shown in detail because it is conventional.

It will include a pair of solenoids to move the valve from the neutral to either a forward position or a reverse position. The electrical lines connecting with these four-way valves may be carried in a common loom 147 to extend to a control switch system of any suitable type, as heretofore previously noted. In addition to these electrical lines connecting the four-way valves, another series of lines, not shown, will connect with the limit switches E indicated in the drawings. These limit switches may function as indicator switches or safety switches or interlocks to control the programming of the operation while other switches connected to the solenoids, will control the actual movement of the components.

FIG. 20 illustrates an alternate embodiment of the invention where the apparatus is adapted to be carried upon a field tractor T'. The body frame F' is mounted upon the tractor with the uprights 85' being secured to the axle housing 150 of the rear wheels of the tractor. This body frame includes guide channels 87' which carry the assembly platform A' with one portion extending forwardly over the tractor and with the other portion extending rearwardly therefrom, the same as heretofore described. A side carriage H' is secured to one side of this tractor which has a bale lift conveyor L' and the baledispensing chamber C', the same as heretofore described. The carriage is mounted on the tractor so that the bale chamber C' lies alongside the assembly platform. The unit also includes a stack support S' formed by a set of forklifts. The unit depicted at FIG. 20 is adapted to only form a single bale stack at a time. Therefore, the bale drag D, heretofore described, is unnecessary. It is contemplated with this arrangement, the tractor will move across the field to pick up bales and when it has a completed bale stack, it will then return to a central destination with the stack and the stack support then functioning as a forklift truck. For example, as illustrated it may extend almost to the ground so that the bale stack may be deposited on the ground. In this arrangement, a stack of bales may also be extended upwardly above the assembly platform as to deposit the stack upon the bed of a truck, a ramp or the like, for the stacking support S may function precisely the same as a forklift of a standard forklift truck.

Figure 29:
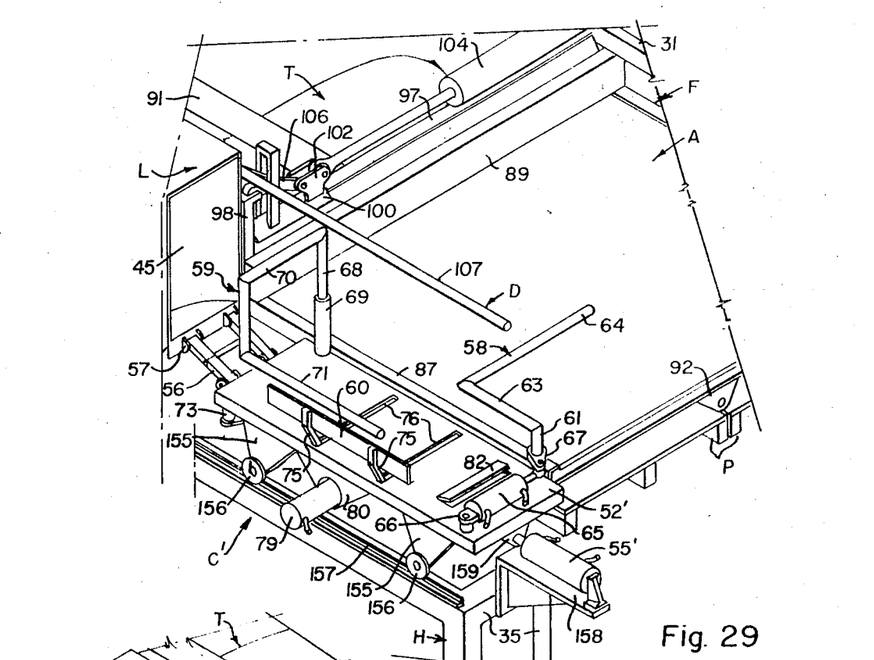
FIG. 29 is a rear, left side isometric view, similar to FIG. 8, but showing a modified construction of the bale-dispensing chamber.

FIG. 29 illustrates an alternate construction of certain components of the apparatus and specifically, a modified mechanism for supporting the bed 52' of the dispensing chamber C'. In lieu of the swing legs heretofore described, the bed 52' of the chamber C' is provided with fixed legs 155 and supporting wheels 156. The assembly is mounted upon longitudinally disposed tracks 157 which are carried upon the top structural members 35 of the carriage H. The view at FIG. 29 shows only the outer track 157 for the inner track is underneath the bed 52' and does not appear, but it is also mounted upon a frame member 35 parallel to the track 157 shown in the FIG. 29.

In this modified construction, the cylinder 55', which shifts the bed 52, is mounted upon a bracket 158 at the rearward end of the chamber C' and in a longitudinal alignment parallel to the tracks 157. Its piston is connected to a bracket 159 on the bed. This cylinder is necessarily longer than the cylinder 55 heretofore described for shifting the bed. Otherwise, this construction may be substantially the same as that heretofore described and the same or a similar control system as that described will shift the bed 52' of the chamber C' back and forth as from the rearward position illustrated, to a forward position adjacent to the discharge end of the lifting conveyor L.

Figure 30:
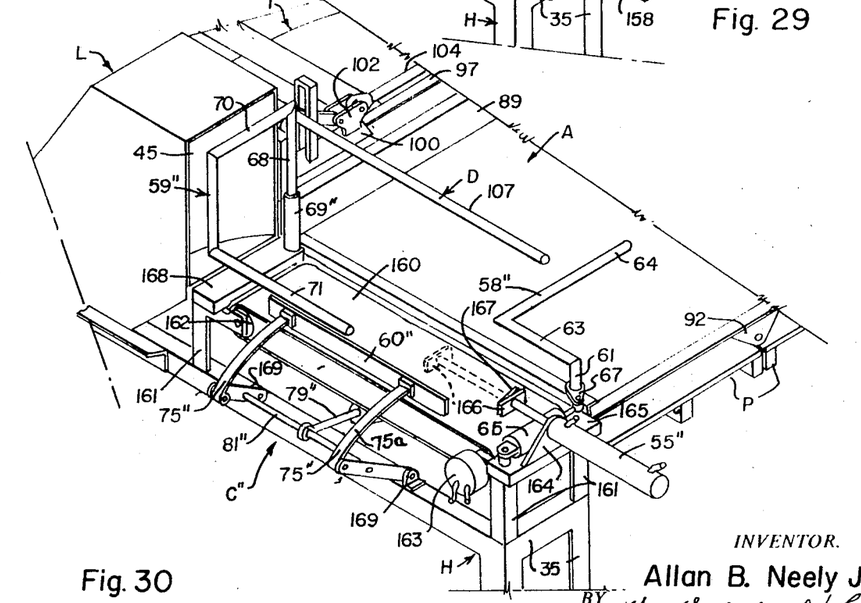
FIG. 30 is a rear, left side isometric view, similar to FIG. 29, but showing another modified construction of the bale-dispensing chamber.

FIG. 30 illustrates another alternate construction, wherein the chamber C'' does not have a shiftable bed, but instead, supports the bales deposited in this chamber C'' upon a belt 160. This belt is supported by struts 161 upstanding from the top of the frame members 35 of the carriage H, with a pair of struts 161 at each end of the reach of the carriage alongside the assembly platform A, carrying the shafts of belt rolls 162. This endless belt is driven by a hydraulic motor 163 which is attached to a roll shaft, preferably at the rear roll 162 to pull the upper surface of the belt rearwardly whenever a bale is discharged from the lift conveyor L and into the chamber C''. This belt will move the bale rearwardly to a proper position for swinging or pushing it onto the platform A as with one of the swing arms 58'' or 59'', or the paddle 60'', hereinafter further described.

The rearward movement of a bale is topped by the extended piston of a cylinder 55'' which is mounted upon a bracket 164, upon and upstanding from a transverse rear header 165 which, in turn, is secured to the rear struts 161. The piston of this cylinder 55'' is adapted to be extended to one of two positions, either to a rearward position where a bale will be located for deposit upon the rearward end of the platform A, or to a forward position, shown in broken lines, where a bale will be located for deposit upon the forward end of the platform A. As such, it will be controlled in the same manner as the shifting cylinders 55 and 55' heretofore described. A head 166 is formed at the end of the piston cylinder 55'' to hold the end of a bale, and a limit switch 167 is carried on this head 166 to be actuated by a bale moving rearwardly on the belt. The switch is associated with controls which will stop the belt motor 163 and will thus set a bale at a proper position with respect to the forward or rearward end of the assembly platform A in the same manner as heretofore described. Such controls are not set forth in detail because they are essentially conventional involving the interconnection of the limit switch 167 with a solenoid valve in the hydraulic circuit of motor 163.

The rear swing arm 58'' and its actuating cylinder 65 are substantially the same as heretofore described, excepting that the components are mounted at a fixed position upon the rear header 165. The forward swing arm 59'' is also substantially the same as heretofore described, excepting that it is mounted at a fixed position upon a front header 168 secured to the struts 161, at the forward end of the chamber C''. The actuating cylinder 72 of this front swing arm is mounted underneath the header 168 in a position not shown, but essentially the same as heretofore described. The operation of the swing arms is dependent upon the positioning of a bale coming onto the belts, the front swing arm 59'' operating only when a bale is topped at the forward portion of the belt 160 and the rear swing arm 58" operating only when a bale is stopped at the rear portion of the belt by the contacting of the cylinder head 166, and such operations can be programmed in any suitable manner in connection with the operation of the paddle 60" to obtain the same results as that theretofore described.

The paddle 60" is necessarily modified by being mounted upon the frame members 35 and is of sufficient length, longitudinally, as to push a bale onto the platform A when the bale is at either the forward or rearward position as heretofore described. This paddle is carried by a pair of spaced arms 75" pivotally secured to a longitudinal frame member 35 by bearing brackets 169. Each arm is an angled member having an upper portion 75a adapted to reach across the belt 160 whenever the paddle is shifted from an initial, outer position to an inner position, over the belt, to move a bale from the belt and onto the platform. Actuation of the arms 75" is essentially the same as that heretofore described. An actuating cylinder 79" is mounted upon a frame member 35 and is connected to a crossbar 81" between the arms 75" as illustrated.

Figure 31:
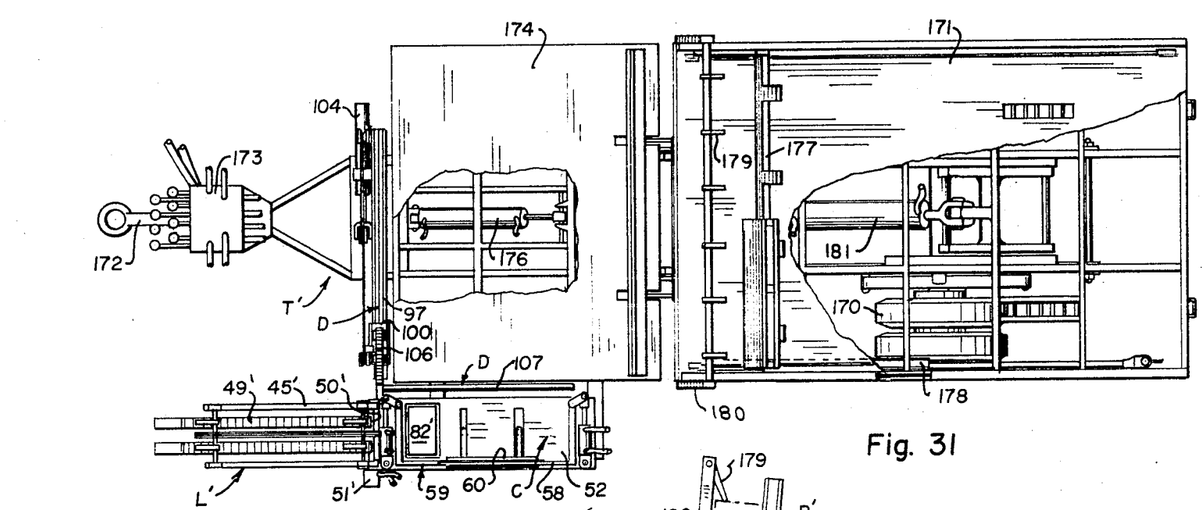
FIG. 31 is a plan view of a conventional type of bale-stacking apparatus modified to incorporate therein the improved bale-dispensing chamber illustrative of a further modification of the invention.
Figure 32:
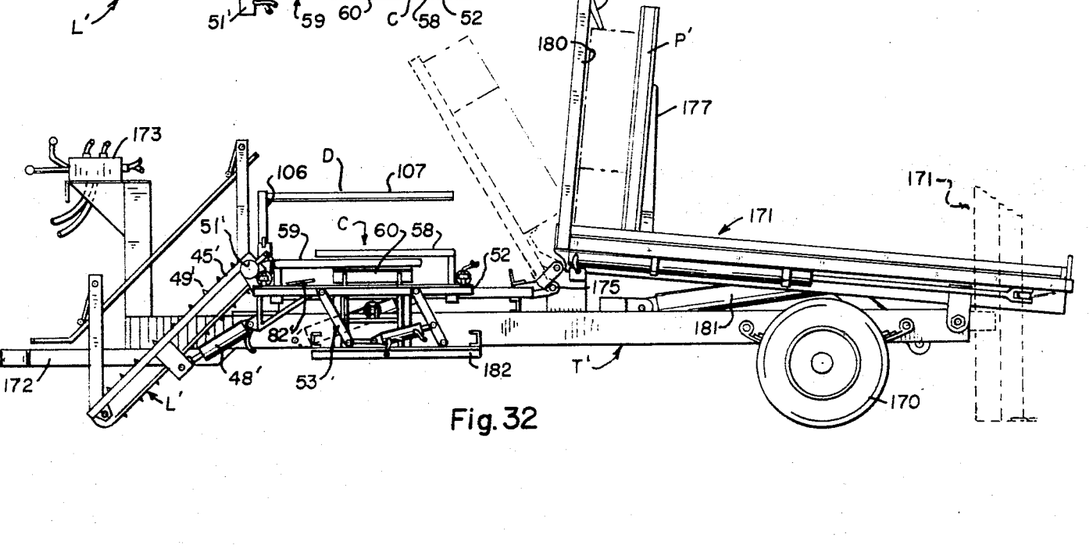
FIG. 32 is a side elevational view of the stacking apparatus shown at FIG. 31 with broken lines indicating the manner in which the bale assembly platform is tilted upwardly and rearwardly to place a bale layer onto the stack-holding component of the apparatus.

FIGS. 31 and 32 show a conventional bale-loading apparatus of the general type disclosed in the U.S. Pat. No. 2,848,127 issued to Gordon E. Gray on Aug. 19, 1958. However, the improved dispensing chamber C is used in this conventional apparatus to place the bales in each layer of the stack upon an assembly platform in an interlocking arrangement so the completed stack will be much more stable than a stack which is formed by the bale-shifting arrangement disclosed in the Gray patent and used in commercial loaders manufactured under that patent.

The apparatus shown at FIGS. 31 and 32, is carried upon a trailer T' with rear wheels 170 being positioned underneath a tippable bale stack holder 171 which receives bale layers to form a stack lying on its side and to thereafter tip vertically. A tongue 172 is located at the front of the trailer T' so it may be connected to a tractor. In the unit illustrated, it is contemplated that a tractor of the type which has the operator's seat at the rear of the tractor will be used for this purpose. Thus, the apparatus may include a manually operating control system 173 upstanding from the tongue at a location which may be reached by the operator. This arrangement, using the manual control 173 as generally illustrated, is an obvious alternate to the automatically programmed system heretofore described.

This bale-stacking apparatus includes further, a tippable bale assembly platform 174 at its forward section which is secured to the frame by a pivot 175 at the rearward edge of the platform adjacent to the stack holder 171. This platform 174 is adapted to be tilted upwardly and rearwardly by a hydraulic cylinder 176 secured to a member of the frame T' and to the underside of the platform 174. Once a layer of bales is placed upon the platform 174, the platform lifts the bale layer upwardly and rearwardly as in the manner indicated in broken lines at FIG. 31. The first layer lifted in this manner will commence a bale stack upon the bale stack holder 171 and other layers will add to the bale stack. This stack holder 171 includes an upstanding abutment 177, preferably forks holding pallets P', against which the first bale layer of a stack is moved. The abutment 177 is adapted to move rearwardly along the surface of the stack holder 171 each time a hay bale layer is moved onto the holder 171 by tipping the assembly platform 174. A suitable mechanism, not shown in detail but including a longitudinal cylinder 178, is provided to regulate the movement of the abutment. To retain each bale stack layer in position as it is pushed onto the stack holder 171 by the platform 174, an array of rearwardly directed dogs 179, which are carried on an inverted, U-shaped frame 180, are adapted to grip the bale stack layer once it is moved onto the holder 171. Once a bale stack is completed on this platform by adding an appropriate number of hay bales onto the stack holder 171, with the abutment 177 being moved to the rearward end of the stack holder 171, the stack holder is tilted upwardly and rearwardly as partially shown in broken lines at FIG. 32, a cylinder 181 being provided for this purpose. The pallets P' on the abutments 177, and the bale stack thereon, are then removed from the abutments 177 to unload the trailer.

The lifting conveyor L' which is adapted to pick up the bales, is a conventional unit having the same essential features as that heretofore described, including a frame 45' supported upon an upper shaft 50' of a chain drive 49'. The frame may thus be swung upwardly as by a cylinder 48'. The endless spike chain 49' is operated by a motor 51' to move bales received by the conveyor L' upwardly and rearwardly. Thus, bales are deposited onto the dispensing chamber C in precisely the same manner as heretofore described.

This chamber C is mounted upon suitable frame members 182 outstanding from one side of the trailer T' to support the chamber alongside the assembly platform 174. The construction and operation of the chamber C is substantially the same as that heretofore described. A bed 52 is mounted upon swing legs 53 to be shifted from one position to another alongside the platform 174. This bed includes a pair of swing arms 58 and 59 and a paddle 60 to push or swing a bale from the chamber and to the platform in a predetermined sequence to form interlocking bale layers such as the layer illustrated at FIG. 22. These movements are controlled by cylinders and by trip plates such as 82' and in the manner heretofore described.

A drag D is mounted at the front of the bale-loading platform 174 with guide channels 97 extending transversely across the body of the trailer to support a carrier 100 which, in turn, supports a drag arm 106 and a longitudinally disposed dragbar 107. This bale layer drag D is adapted to move a bale layer formed upon the platform 174 adjacent to the chamber C across the platform in the manner illustrated at FIG. 23.

I have now described my invention in considerable detail. However, it is obvious that others skilled in the art can build and devise alternate and equivalent constructions which are, nevertheless, within the spirit and scope of my invention.

I claim:

1. A generally rectangular bale-dispensing chamber adapted to receive a bale and to dispense the same onto a platform alongside one side of the chamber and comprising in combination therewith:
   a. a bale-moving means adapted to move a bale into the chamber to a selected position with respect to the platform;
   b. a paddle at the side of the chamber opposite the side adjacent to the platform, adapted to move laterally across the chamber and to push a bale onto the platform to a longitudinal position, paralleling its position in the chamber;
   c. a swing arm at the side of the chamber opposite the side adjacent to the platform and having a pivot axis at the side of the chamber adjacent to the platform and substantially at an end of the selected bale position, said arm being adapted to rotate about the pivot axis to move across the chamber to push a bale onto the platform and at the same time rotate the bale to a transverse position perpendicular to its position in the chamber and adjacent to that end of the selected bale position in the chamber where the pivot axis is located; and
   d. operative means adapted to selectively move the paddle and rotate the swing arm to place a bale pushed from the chamber either to a longitudinal position or to a transverse position upon the platform.

2. In the organization defined in claim 1, wherein:
   said bale-moving means is adapted to place a bale at a second position with respect to the platform which is offset one bale width from the end of the aforesaid selected position, to thereby establish a bale stack layer location on the platform having a width which is the aggregate of a bale length and a bale width, whereby, the bale-moving means places a bale at that one of the said positions where the swing arm pivot is at an end of the established bale stack location and the swing arm rotates to place a bale transversely upon the platform with respect to the chamber at one end of the bale stack location, the bale-moving means then places a second bale at the other of the said positions and the paddle moves to place the second bale longitudinally upon the platform, alongside and perpendicular to the first-mentioned bale.

3. In the organization defined in claim 2, including:
a second swing arm the same as but opposite to the first swing arm and having its pivot axis substantially at the other end of the aforesaid bale stack location, whereby this swing arm may rotate about its pivot axis to push a bale onto the platform to a transversely disposed position at that end of the bale stack location.

4. In the organization defined in claim 3, wherein:
a bale is adapted to move into the chamber longitudinally from one end thereof; and
the swing arm at the side of the chamber adjacent to the bale entrance end is connected to its pivot by an arched end section extending over the chamber to provide clearance for the movement of the bale into the chamber.

5. In the organization defined in claim 3, wherein:
the bale-moving means is adapted to place a bale at a third position with respect to the platform which is offset one bale width from the aforesaid selected position in the direction opposite to the aforesaid second position to establish a bale stack location having a width which is the aggregate of a bale length and two bale widths, and
means to locate the swing arm pivot axes at the ends of the bale stack locations.

6. In the organization defined in claim 3, wherein:
said chamber is proportioned to receive a single bale;
a shifting means supporting the chamber is adapted to shift the chamber longitudinally alongside the platform to the aforesaid first position and to the second position, whereby to permit bales to be transferred from the chamber and onto the platform as layers of varying longitudinal and transverse arrangements.

7. In the organization defined in claim 6 further including:
a means associated with the platform adapted to shift the platform to transfer the layer thereon to a bale stack layer support means;
said bale stack layer support means comprising a tippable, flat deck adapted to be normally substantially horizontal to receive a bale stack layer on edge and to be tipped upwardly when the same is loaded with bale stack layers; and wherein said platform is pivoted to tip a bale layer upon edge and onto the deck.

8. In the apparatus set forth in claim 3, wherein the chamber includes a floor comprising:
a longitudinal belt means adapted to receive a bale from one end of the chamber and to move the bale into the chamber; and
a stop means at the other end of the chamber adapted to stop the movement of the bale at either of the aforesaid selected and offset positions.

9. In the organization set forth in claim 8, including a second swing arm at the end of the chamber opposite the first-mentioned swing arm, and wherein:
said chamber is of sufficient length as to permit a bale to be placed at a first position near one end of the platform and at a second position near the other end of the platform; and wherein
said stop is shiftable to selectively position the bales at either end of the platform to permit the same to be transferred from the chamber and onto the platform in varying longitudinal and transverse arrangements to produce interlocking stack layer patterns.

10. A bale-dispensing chamber adapted to receive bales and to dispense the same to a platform alongside the chamber, and comprising in combination therewith:
a. a chamber floor of generally rectangular proportions having one longer side disposed longitudinally alongside the platform;
b. a longitudinally disposed paddle at the opposite, longer side of the chamber adapted to push a bale deposited in the chamber sidewise and onto the platform in a position paralleling its position in the chamber;
c. a swing arm at one end of the chamber adapted to swing and rotate a bale deposited in the chamber therefrom and onto the platform in a position transverse to its position in the chamber;
d. a second swing arm at the end of the chamber opposite the first-mentioned swing arm; and
e. a shifting means supporting the chamber and being adapted to shift the chamber longitudinally, alongside the platform, to a first position near one end of the platform and to a second position near the other end of the platform, whereby to permit bales to be transferred from the chamber and onto the platform in varying longitudinal and transverse arrangements to produce interlocking stack layer patterns.

11. In the apparatus set forth in claim 10, wherein said shifting means includes a pair of rocker arms supporting the platform.

12. In the organization set forth in claim 10, wherein the shifting means includes:
a wheel means supporting the platform; and
a track means supporting the wheel means.